US009615193B1

(12) United States Patent
Savant

(10) Patent No.: US 9,615,193 B1
(45) Date of Patent: Apr. 4, 2017

(54) SYSTEMS AND METHODS FOR MANAGING LAUNCH ACTIVITIES ON A MOBILE DEVICE

(71) Applicant: Symantec Corporation, Mountain View, CA (US)

(72) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 56 days.

(21) Appl. No.: 14/105,640

(22) Filed: Dec. 13, 2013

(51) Int. Cl.
 *H04W 4/00* (2009.01)
(52) U.S. Cl.
 CPC .................. *H04W 4/003* (2013.01)
(58) Field of Classification Search
 USPC ....................... 455/566, 456.1–457
 See application file for complete search history.

(56) References Cited

U.S. PATENT DOCUMENTS

| | | | | |
|---|---|---|---|---|
| 2002/0142792 A1* | 10/2002 | Martinez | ........................ | 455/550 |
| 2005/0182732 A1* | 8/2005 | Miller et al. | ..................... | 705/59 |
| 2008/0127170 A1* | 5/2008 | Goldman et al. | .............. | 717/174 |
| 2010/0262953 A1* | 10/2010 | Barboni | ..................... | G06F 8/61 |
| | | | | 717/120 |
| 2011/0072492 A1* | 3/2011 | Mohler et al. | ..................... | 726/3 |
| 2012/0146924 A1* | 6/2012 | Inoue | ........................... | 345/173 |
| 2013/0047150 A1* | 2/2013 | Malasky | ............. | G06F 9/44547 |
| | | | | 717/176 |
| 2014/0047458 A1* | 2/2014 | Li | ..................... | H04M 1/72525 |
| | | | | 719/315 |

OTHER PUBLICATIONS

Guiding Tech, "How to Rename Android Apps and Change their Icons", http://www.guidingtech.com/12252/rename-android-apps-change-icons/, as accessed Oct. 17, 2013, (Jun. 16, 2012).
Gabor, "Removing an app icon from launcher", http://www.helloandroid.com/tutorials/removing-app-icon-launcher, as accessed Oct. 17, 2013, Hello Android.Com, (Apr. 20, 2011).
Amit, "How to change Android launcher activity from AndroidMainfest file", http://blogs.technicise.com/how-to-change-android-launcher-activity-from-androidmainfest-file/, as accessed Oct. 17, 2013, Technicise.com, (Jul. 4, 2013).
"Two launcher activities", http://stackoverflow.com/questions/8927315/two-launcher-activities, as accessed Oct. 17, 2013, Stack Overflow.Com, (Jan. 19, 2012).
Reynolds, Derek "How to Have Multiple Launcher Icons in One Android APK Install for Different Activities", http://derekreynolds.wordpress.com/2012/06/09/how-to-have-multiple-launcher-icons-in-one-android-apk-install-for-different-activities/, as accessed Oct. 17, 2013, (Jun. 9, 2012).

* cited by examiner

*Primary Examiner* — Marisol Figueroa
(74) *Attorney, Agent, or Firm* — Fisherbroyles LLP

(57) ABSTRACT

A computer-implemented method for managing launch activities on a mobile device may include maintaining a plurality of launch activities associated with an application. Each launch activity in the plurality of launch activities may be associated with a different launch icon. The method may further include identifying a mobile device environment within which the application is being used. The method may also include selecting, from the plurality of launch activities, a launch activity that corresponds to the mobile device environment. The method may additionally include enabling the launch activity that corresponds to the mobile device environment. Various other methods, systems, and computer-readable media are also disclosed.

18 Claims, 7 Drawing Sheets

SYSTEMS AND METHODS FOR MANAGING LAUNCH ACTIVITIES ON A MOBILE DEVICE

BACKGROUND

When mobile users search for mobile applications in an application store (e.g., ANDROID APPS on GOOGLE PLAY), they may discover many variations of the same application. For example, a user searching for a security application may be confused to find multiple applications from the same software security vendor, each with a different (or slightly different) name. Vendors may sell such products under different names depending on whether, for example, the application is meant for an enterprise environment or a consumer environment. Selling multiple versions of the same product or application may create brand confusion for customers and unnecessary overhead for vendors and developers. Developers may attempt to address this problem by creating a single application that can be altered, after purchase, for use with the various environments within which the application may be used. However, on certain mobile platforms, such as ANDROID, once an application is installed, developers may be unable to change the application name and icon unless they uninstall the application, alter the application manifest file to point to a different name and icon, recompile the application code into an Application Package File (APK), and reinstall the application.

What is needed, therefore, is a more efficient and effective mechanism for tailoring application for particular computing environments.

SUMMARY

As will be described in greater detail below, the instant disclosure generally relates to systems and methods for managing launch activities on a mobile device. For example, a method for managing launch activities on a mobile device may include maintaining a plurality of launch activities associated with an application. Each launch activity in the plurality of launch activities may be associated with a different launch icon. The method may further include identifying a mobile device environment within which the application is being used. The method may also include selecting, from the plurality of launch activities, a launch activity that corresponds to the mobile device environment. The method may additionally include enabling the launch activity that corresponds to the mobile device environment.

In some embodiments, identifying the mobile device environment may include identifying a license that was used to activate the application. In some examples, identifying the mobile device environment may include identifying a carrier of the mobile device, a manufacturer of the mobile computing device, and/or a device type of the mobile device.

In at least one embodiment, enabling the launch activity may include enabling display of a launch icon associated with the launch activity. In some examples, the launch icon may include a graphical image and an application name configured to be displayed within a root application launcher interface. In various embodiments, the computer-implemented method may further include, after enabling display of the launch icon, displaying a notification within a graphical user interface on the mobile device that indicates to a user of the mobile device that display of the launch icon has been enabled.

In at least one example, the computer-implemented method may further include disabling, after identifying the mobile device environment within which the application is being used, at least one launch activity within the plurality of launch activities that does not correspond to the mobile device environment.

In one embodiment, a system for implementing the above-described method may include a maintenance module, stored in memory, that maintains a plurality of launch activities associated with an application. Each launch activity in the plurality of launch activities may be associated with a different launch icon. The system may further include an identification module, stored in memory, that identifies a mobile device environment within which the application is being used. The system may also include a selection module, stored in memory, that selects, from the plurality of launch activities, a launch activity that corresponds to the mobile device environment. The system may additionally include a launch configuration module, stored in memory, that enables the launch activity that corresponds to the mobile device environment. The system may also include at least one processor configured to execute the maintenance module, the identification module, the selection module, and the launch configuration module.

In some examples, the system may further include a notification module, stored in memory, that displays a notification within a graphical user interface on a mobile device that indicates to a user of the mobile device that display of the launch icon has been enabled.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to maintain a plurality of launch activities associated with an application. Each launch activity in the plurality of launch activities may be associated with a different launch icon. The one or more computer-executable instructions may further cause the computing device to identify a mobile device environment within which the application is being used. The one or more computer-executable instructions may also cause the computing device to select, from the plurality of launch activities, a launch activity that corresponds to the mobile device environment. The one or more computer-executable instructions may additionally cause the computing device to enable the launch activity that corresponds to the mobile device environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
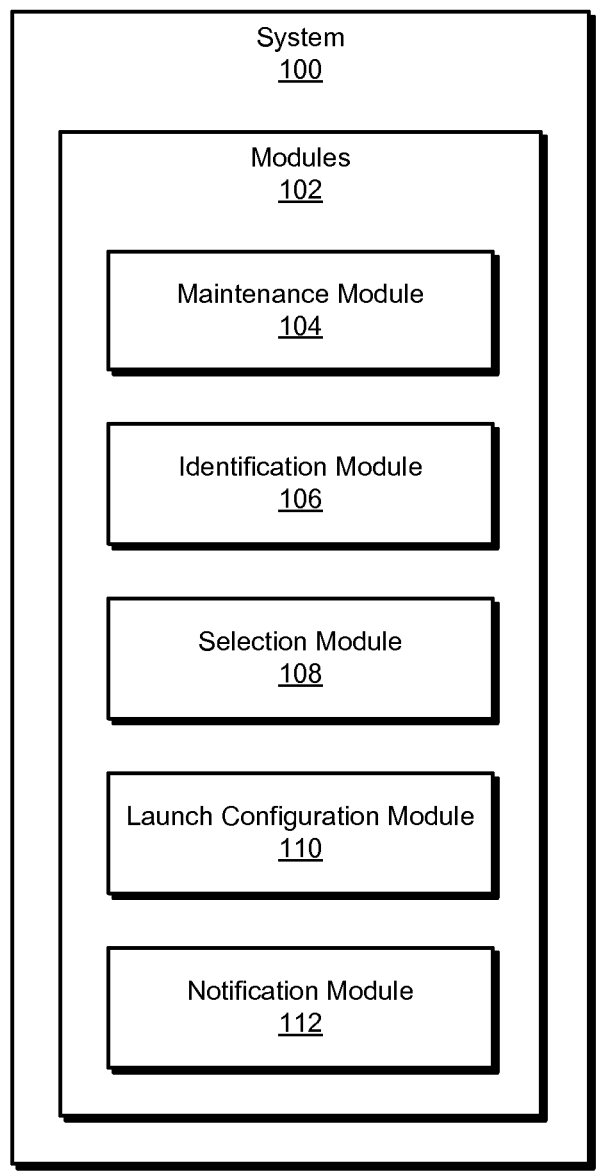
FIG. 1 is a block diagram of an exemplary system for managing launch activities on a mobile device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing launch activities on a mobile device. As will be explained in greater detail below, the systems and methods herein may identify an environment within which an application on a mobile device is being used and enable a launch activity that corresponds to that environment. For example, embodiments of the instant disclosure may maintain multiple launch activities that correspond to different launch icons. The systems and methods herein may then detect an environment within which the application on the mobile device is being used and select and enable the launch activity that corresponds to that environment. By dynamically enabling and disabling launch activities for an application on a mobile device (e.g., on an ANDROID device), mobile developers can create a single application that can be tailored, after installation, for use within a variety of mobile environments, thereby decreasing developer overhead and decreasing confusion for customers attempting to purchase the application.

Figure 2:
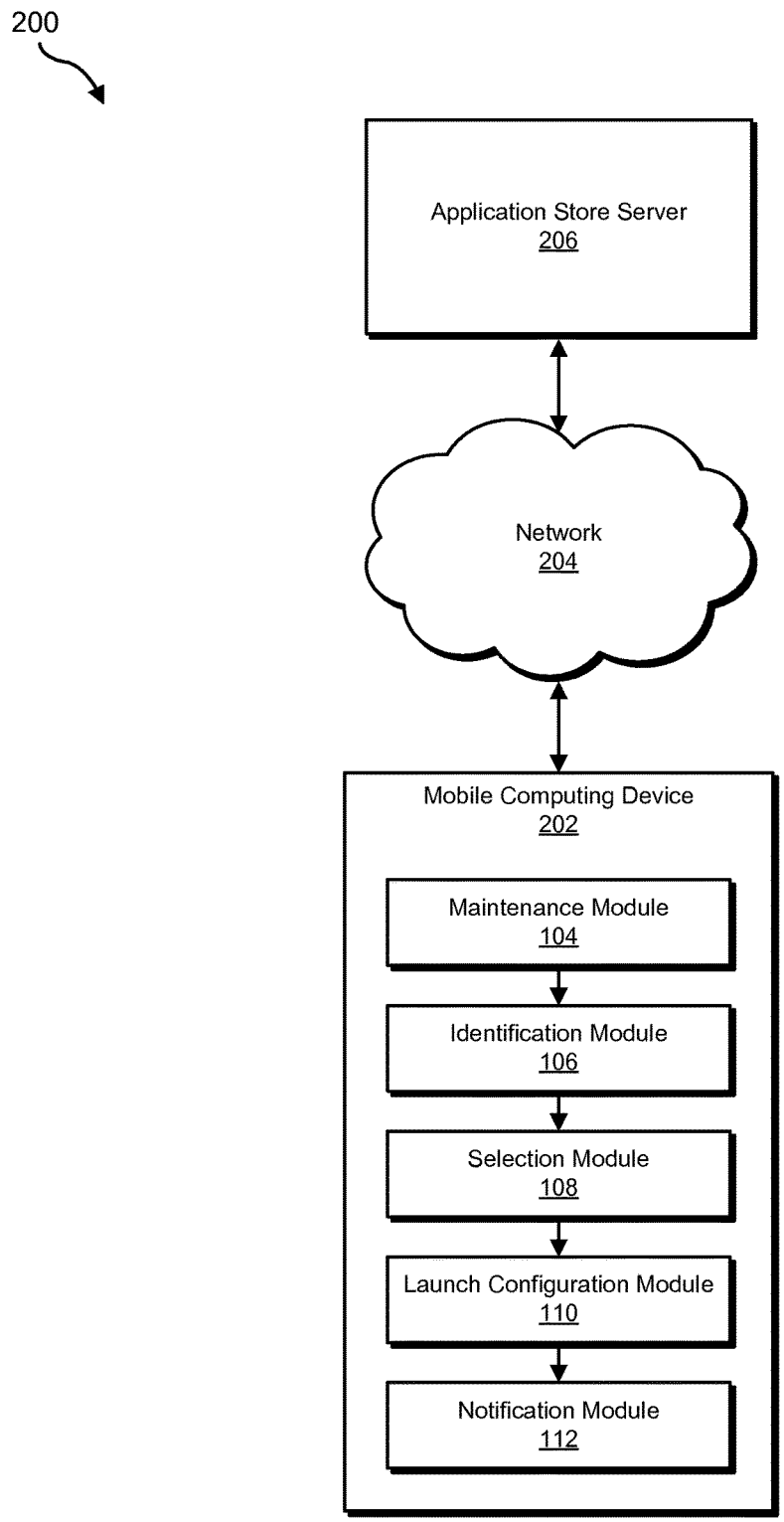
FIG. 2 is a block diagram of the exemplary system shown in FIG. 1 implemented on a computing device that is in communication with a server via a network.

The following will provide, with reference to FIGS. 1-2, detailed descriptions of exemplary systems for managing launch activities on a mobile device. Detailed descriptions of corresponding computer-implemented methods will also be provided in connection with FIG. 3. In addition, detailed descriptions of graphical user interfaces that show exemplary implementations of the method described in FIG. 3 will be provided in connection with FIGS. 4A-4B and 5A-5B. Detailed descriptions of a computing system and network architecture capable of implementing one or more of the embodiments described herein will also be provided in connection with FIGS. 6 and 7, respectively.

FIG. 1 is a block diagram of an exemplary system 100 for managing launch activities on a mobile device. As illustrated in this figure, exemplary system 100 may include one or more modules 102 for performing one or more tasks. For example, and as will be explained in greater detail below, exemplary system 100 may include a maintenance module 104 that may maintain a plurality of launch activities associated with an application. Exemplary system 100 may also include an identification module 106 that identifies a mobile device environment within which the application is being used. System 100 may additionally include a selection module 108 that selects, from the plurality of launch activities, a launch activity that corresponds to the mobile device environment. System 100 may further include a launch configuration module 110 that enables the launch activity that corresponds to the mobile device environment. In some embodiments, system 100 may include a notification module 112 that displays a notification within a graphical user interface on the mobile computing device that indicates to a user of the mobile computing device that display of the launch icon has been enabled. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile computing device 202 and/or application store server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile computing device 202 in communication with an application store server 206 via a network 204. In one example, mobile computing device 202 may be programmed with one or more of modules 102. Additionally or alternatively, application store server 206 may be programmed with one or more of modules 102.

In one embodiment, one or more of modules 102 from FIG. 1 may, when executed by at least one processor of mobile computing device 202 and/or application store server 206, enable mobile computing device 202 and/or application store server 206 to manage launch activities on a mobile device. For example, and as will be described in greater detail below, maintenance module 104 may be programmed to maintain a plurality of launch activities associated with an application that is stored on mobile computing device 202. In addition, each launch activity in the plurality of launch activities may be associated with a different launch icon. Identification module 106 may be programmed to identify a mobile device environment within which the application is being used, such as a mobile device environment of mobile computing device 202. Selection module 108 may be programmed to select, from the plurality of launch activities, a launch activity that corresponds to the mobile device environment of mobile computing device 202. In addition, launch configuration module 110 may be programmed to enable the launch activity that corresponds to the mobile device environment of mobile computing device 202.

In some embodiments, notification module 112 may be programmed to display a notification within a graphical user interface on mobile computing device 202 that indicates to a user of mobile computing device 202 that display of the launch icon has been enabled.

Mobile computing device 202 generally represents any type or form of mobile computing device capable of reading computer-executable instructions. Examples of mobile computing device 202 include, without limitation, laptops, tablets, cellular phones, Personal Digital Assistants (PDAs), multimedia players, embedded systems, combinations of one or more of the same, exemplary computing system 610 in FIG. 6, or any other suitable mobile computing device. In addition, mobile computing device 202 may represent and/ or be configured with a variety of mobile device platforms and/or operating systems, such as ANDROID, ASHA, BLACKBERRY, iOS, WINDOWS PHONE, WINDOWS RT, BADA, BLACKBERRY OS, BREW, GRIDOS, LINUX, MER, NEMO MOBILE, S40, SAILFISH OS, SHR, SYMBIAN OS, TIZEN, WEBOS, and/or any other suitable platform and/or operating system.

Application store server 206 generally represents any type or form of computing system that is configured to provide and/or sell mobile applications via a graphical user interface (e.g., via an internet browser or "app store" application). In some embodiments, application store server 206 may be configured to receive a request from an application on a mobile device to activate a license for the application. For example, an application on mobile computing device 202 may, after installation, attempt to activate a license for the application by connecting to and communicating with application store server 206. Examples of application stores provides by application server 206 include, without limitation, GOOGLE PLAY on ANDROID, APP STORE on IOS, MARKETPLACE on WINDOWS PHONE, etc.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between mobile computing device 202 and application store server 206.

Figure 3:
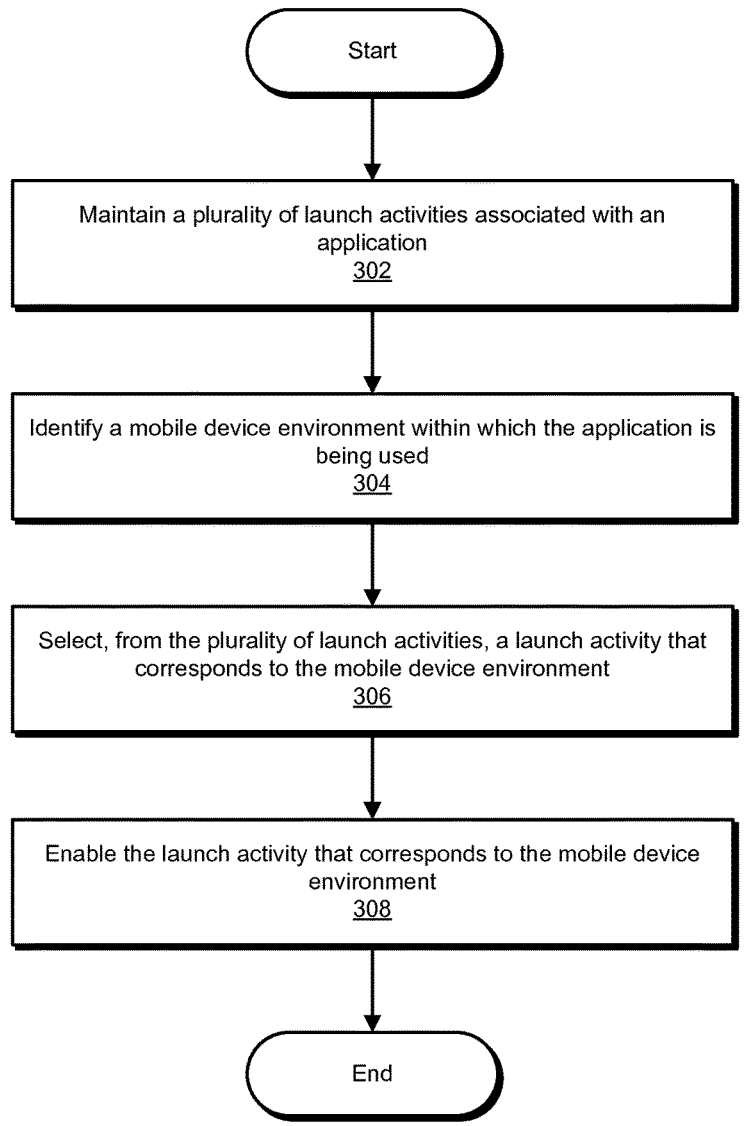
FIG. 3 is a flow diagram of an exemplary method for managing launch activities on a mobile device.

FIG. 3 is a flow diagram of an exemplary computer-implemented method 300 for managing launch activities on a mobile device. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may maintain a plurality of launch activities associated with an application, and each launch activity in the plurality of launch activities may be associated with a different launch icon. For example, maintenance module 104 may, as part of mobile computing device 202 in FIG. 2, maintain a plurality of launch activities associated with an application that is stored on mobile computing device 202.

As used herein, the phrase "launch activity" generally refers to any code and/or process that executes in response to activation of a launch icon on a mobile device. For example, a launch activity may include a process that executes when a user of a mobile computing device (e.g., mobile computing device 202) "taps" or "clicks" an icon on a mobile phone. In some examples, a launch activity may provide an interactive graphical user interface that is displayed in response to a user activating a launch icon associated with an application. For example, after a user taps the launch icon associated with an application, the application may display the application home screen.

A launch activity may be activated in a variety of ways. For example, a user of a mobile device may activate a launch activity on the mobile device by tapping, clicking, and/or selecting an application icon associated with the launch activity. In some embodiments, a launch activity may be an entry point into an application. For example, a launch icon that is associated with an application may, when tapped or clicked, provide a user of the application with an interactive graphical user interface that allows the user to access and/or utilize functions of the application.

In various embodiments, the phrase "launch activity" may refer to a "launcher activity" on ANDROID devices. A launcher activity on an ANDROID device may be any activity or process of an application that is designated in code as the main and/or launcher activity. For example, when a user taps or clicks the launch icon associated with an ANDROID application, the application may, in response, display a graphical user interface that is defined by the parameters, code, and/or computer-readable instructions that may be included within the launcher activity. In some embodiments, a launcher activity may be any activity designated (by, e.g., a set of computer-readable instructions or code) within the manifest of an Application Package File (APK) as the main and/or launcher activity of an application. In some examples (and as will be described in greater detail below), a manifest for an APK may contain multiple launcher activities configured to be enabled or disabled by the application.

In at least one example, the phrase "launcher activity" may refer to code and/or computer-readable instructions within the manifest of an APK that designates an activity as a launcher activity for an application. In these examples, the manifest may contain code and/or computer readable instructions for each launcher activity that points to one or more launch icon resources (e.g., a graphical image resource and character string resource) that are associated with the application. For example, the manifest may point to a resource folder that contains an icon image and a name resource that contains a character string configured to be displayed along with the icon image. In some embodiments, after an application is installed on a device (e.g., an ANDROID device), the application may be unable to point to icon resources different from those designated during installation (i.e., once an application is installed, the application icon and application name may be locked in place by an operating system of a device).

As used herein, the phrase "launch icon" generally refers to any graphical image and/or text configured to be displayed within a graphical user interface that, when activated, causes a computing device to execute an application associated with the launch icon. In some embodiments, the phrase "launch icon" may refer to both an image file and a graphical depiction of the name of the application. For example, a launch icon for an ANDROID application may include both an image file and a character string configured to be displayed in an application launcher interface. In these examples, a user of an ANDROID device may initiate or "start" the application by tapping the image and/or character string associated with the application. The phrase "launch icon" may refer to any other suitable graphical shortcut, representation, character string, name, depiction, and/or image configured to be displayed on a device that, when activated, executes the launch activity of an application associated with the launch icon.

A plurality of launch activities associated with an application may be maintained in a variety of ways. For example, an application that includes a plurality of launch activities may be referred to as an application that maintains a plurality of launch activities. Alternatively, launch activities may be maintained by being installed with an application. In some embodiments, a launch activity may be maintained by being programmed into and/or included with an application. For example, maintenance module 104 may be configured to maintain and/or provide a list of launch activities for an application. In addition, maintenance module 104 may be configured to ensure that each launch activity points to and is associated with the correct launch icon.

Any suitable number of launch activities may be associated with an application (e.g., two, five, ten, or fifty launch activities, etc.). In some embodiments (e.g., on ANDROID devices), maintenance module 104 may maintain a plurality of launch activities by designating multiple activities within an application manifest as "launcher activities." In this example, each activity within the manifest that is designated as a launcher activity may point to a different launch icon. For example, one launcher activity may point to a launch icon for business environments while a second launcher activity may point to a launch icon for consumer environments.

Launch activities may be associated with an application in a variety of a ways. For example, on ANDROID devices, a launch activity may be associated with an application if it is designated as a launcher activity within the manifest of the APK. Launch activities may also be associated with an application in any other suitable manner.

As illustrated in FIG. 3, at step 304 one or more of the systems described herein may identify a mobile device environment within which the application is being used. For example, identification module 106 may identify a mobile device environment within which the application on mobile computing device 202 is being used.

As used herein, the phrase "mobile device environment" generally refers to any type of setting, situation, platform, operating system, hardware configuration, software configuration, surrounding, circumstance, condition, context, and/or locale within which an application is being used. For example, a mobile device environment may refer to an enterprise environment or a consumer environment. In this example, an enterprise environment may be a business-oriented environment while a consumer environment may be one that is tailored for individual users. In some embodiments, the phrase "mobile device environment" may refer to a hardware configuration and/or specific device type. For example, an application installed on a GOOGLE NEXUS device may be within a different mobile device environment than an application installed on a SAMSUNG GALAXY device. In another example, an application installed on a WINDOWS tablet device may be within a different mobile device environment than an application installed on a WINDOWS mobile phone.

In at least one embodiment, the phrase "mobile device environment" may refer to a carrier of the mobile device within which an application is being used. For example, an application being used on a VERIZON mobile phone may be within a different mobile device environment than an application being used on a SPRINT mobile phone. In some examples, a mobile device environment may refer to a vendor of the application. For example, a NORTON security application provided by COMCAST may be within a different mobile device environment than a NORTON security application provided by VERIZON. In some embodiments, the phrase "mobile device environment" may refer to a demographic within which an application is being used. For example, applications used by young mobile device users (e.g., children or teenagers) may be within a different mobile device environment than applications used by adult users.

In some examples, the phrase "mobile device environment" may refer to an environment arbitrarily designated by a developer and/or vendor of the application. For example, a mobile application developer may, for branding purposes, designate users within the United States as being within a different mobile device environment than users within other countries. The phrase "mobile device environment" may refer to any other suitable context and/or environment within which an application on a mobile device may be used.

Identification module 106 may identify a mobile device environment within which the application is being used in a variety of ways. For example, identification module 106 may identify a mobile device environment by identifying a license used to activate the application. In some examples, an application may be licensed for activation on mobile computing device 202. In this example, identification module 106 may identify the mobile device environment by identifying the license used to activate the application. For example, identification module 106 may detect that the license used to activate the application was a license used by a particular business.

In some embodiments, identification module 106 may identify a mobile device environment by identifying a carrier of mobile computing device 202. For example, identification module 106 may detect that mobile computing device 202 is a VERIZON mobile phone. Additionally or alternatively, identification module 106 may identify a mobile device environment by identifying a manufacturer of mobile computing device 202. For example, identification module 106 may detect that mobile computing device 202 is a device manufactured by SAMSUNG. In various examples, identification module 106 may identify a mobile device environment by identifying a device type of mobile computing device 202. In some embodiments, the device type may refer to the form factor of a mobile computing device, such as, for example, a tablet or smartphone form factor. In at least one embodiment, the device type may refer to a specific build of a mobile computing device, such as a device built for heavy outdoor use as opposed to a device built for casual use. For example, identification module 106 may identify a mobile device environment for mobile computing device 202 by detecting that mobile computing device 202 is a TOUGHBOOK (i.e., a mobile device designed for rigorous use). Identification module 106 may identify a mobile device environment using any other suitable process.

As illustrated in FIG. 3, at step 306 one or more of the systems described herein may select, from the plurality of launch activities, a launch activity that corresponds to the mobile device environment. For example, selection module 108 may select, from the plurality of launch activities, a launch activity that corresponds to the mobile device environment of mobile computing device 202.

Selection module 108 may select a launch activity in a variety of ways. For example, selection module 108 may parse a list or file that contains associations between launch activities and mobile device environments and may select the launch activity that is associated with the mobile device environment identified by identification module 106. In embodiments where mobile computing device 202 is an ANDROID device, selection module 108 may select one of multiple launcher activities designated as such within the application manifest. For example, a manifest for an application may designate two activities as launcher activities-one launcher activity for a consumer environment and another for an enterprise environment. In this example, identification module 106 may have previously identified that a consumer license was used to activate the application, and selection module 108 may then, based on the fact that identification module 106 identified a consumer license, select the launcher activity within the manifest that corresponds to a consumer environment.

As illustrated in FIG. 3, at step 308, one or more of the systems described herein may enable the launch activity that corresponds to the mobile device environment. For example, launch configuration module 110 may enable a launch activity that corresponds to the mobile device environment of mobile computing device 202.

Launch configuration module 110 may enable the launch activity in a variety of ways. For example, launch configuration module 110 may enable the launch activity by enabling display of a launch icon associated with the launch activity. In some embodiments, the launch icon may include a graphical image and an application name configured to be displayed within a root application launcher interface. A root application launcher interface may include an interface that displays launch icons that are pointed to by the launch activity. In some examples, after an application is installed on mobile computing device 202, the application may be unable to cause a launch activity to point to a different launch icon.

In some examples, launch configuration module 110 may enable the launch activity that corresponds to the mobile device environment by enabling a launcher activity within an application manifest that corresponds to the mobile device environment. For example, launch configuration module 110 may designate the launcher activity selected by selection module 108 as the "active" or "enabled" launcher activity. In some examples, launch configuration module 110 may enable a launch activity by calling and executing a system-level Application Programming Interface (API) function configured to enable and/or disable application activities. Launch configuration module 110 may enable the launch activity that corresponds to mobile device environment using any other suitable process.

In at least one embodiment, launch configuration module 110 may, after identifying the mobile device environment within which the application is being used, disable at least one launch activity within the plurality of launch activities that does not correspond to the mobile device environment. For example, identification module 106 may identify that the mobile device environment is a consumer environment, and launch configuration module 110 may then disable a launch activity corresponding to a business environment. Launch configuration module 110 may disable the at least one launch activity that does not correspond to the mobile device environment in a variety of ways. For example, on ANDROID devices, launch configuration module 110 may alter application settings for the at least one launcher activity. In some examples, launch configuration module 110 may disable the at least one launch activity by calling and executing a system-level API function that is configured to enable and/or disable application activities. Launch configuration module 110 may disable the at least one launch activity using any other suitable process.

Launch configuration module 110 may disable the at least one launch activity at any time after identification module 106 identifies the mobile device environment. For example, launch configuration module 110 may disable the at least one launch activity immediately after identification module 106 identifies the mobile device environment or at any other length of time after the mobile device environment has been identified.

In some embodiments, after enabling display of the launch icon, the systems described herein may display a notification within a graphical user interface on the mobile computing device that indicates to a user of the mobile computing device that display of the launch icon has been enabled. For example, notification module 112 may, after launch configuration module 110 enables display of the launch icon, display a notification within a graphical user interface on mobile computing device 202 that indicates to a user of mobile computing device 202 that display of the launch icon has been enabled.

Figure 4A:
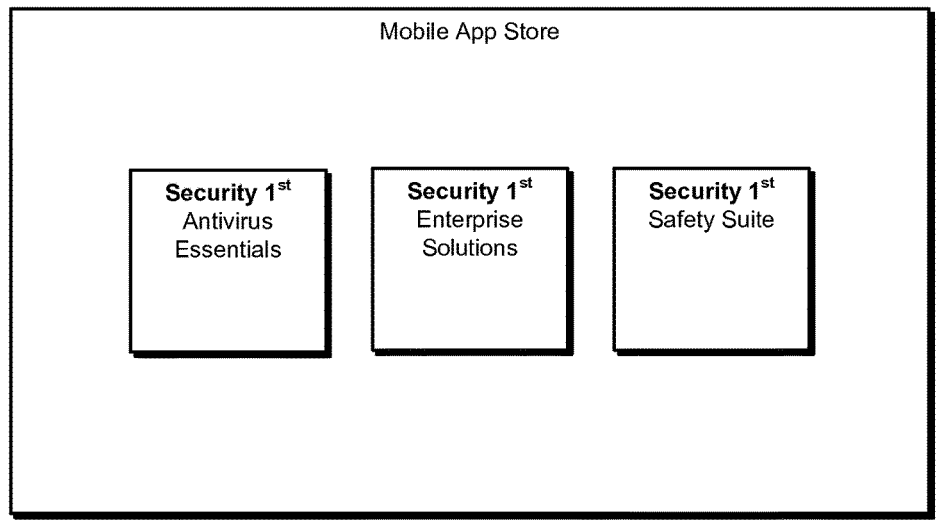
FIG. 4A is an illustration of an exemplary graphical user interface used to sell mobile applications.
Figure 4B:
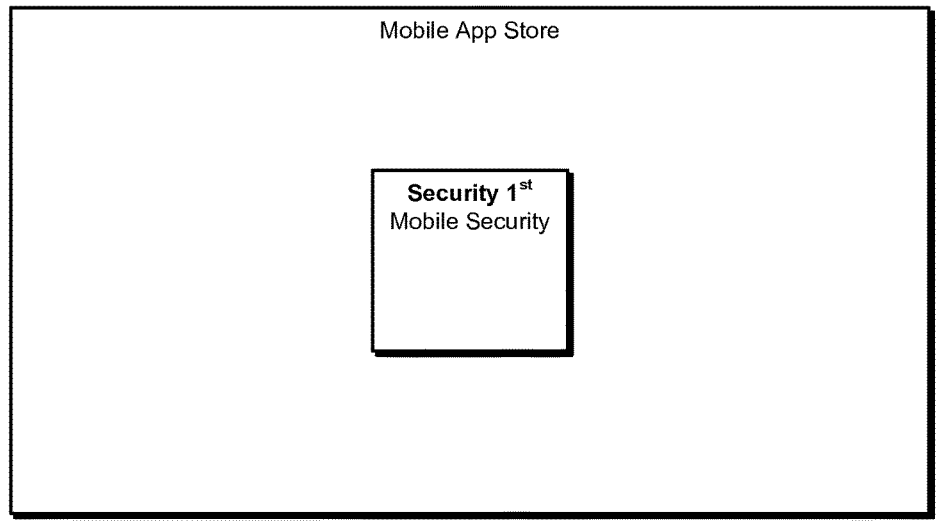
FIG. 4B is an illustration of an exemplary graphical user interface used to sell mobile applications.

The following descriptions of FIGS. 4A-4B and 5A-5B are provided to illustrate embodiments of implementing the above-described method on a mobile computing device, such as mobile computing device 202 in FIG. 2. FIGS. 4A-4B are illustrations of an exemplary graphical user interface used to sell mobile applications. For example, application store server 206 may be configured to display FIGS. 4A-4B within an internet browser or an "app store" on mobile computing device 202. FIG. 4A shows a variety of software security applications provided by exemplary software security vendor Security $1^{st}$. Security $1^{st}$, in this exemplary illustration, is selling three different versions of their product, including Security 1st Antivirus Essentials, Security $1^{st}$ Enterprise Solutions, and Security $1^{st}$ Safety Suite. A user searching for a Security $1^{st}$ product may be confused to find multiple versions of the same Security $1^{st}$ product. The user may be unsure which Security $1^{st}$ product is right for them.

To address this issue, and to cut down on the overhead incurred by managing multiple applications, Security $1^{st}$ may provide a single product that can, after installation, be tailored to fit the environment in which it is being used. FIG. 4B shows what the mobile application store may look like after Security $1^{st}$ creates a single, unified product named Security $1^{st}$ Mobile Security. When a user searches for a Security $1^{st}$ product in the mobile application store, they may no longer be shown multiple Security $1^{st}$ applications, but instead may be shown the unified Security $1^{st}$ Mobile Security application. The Security $1^{st}$ Mobile Security application may be an application that can be tailored, after installation, for use with the environment that the application is being used in. Users who are looking to purchase a product from Security $1^{st}$ may no longer have trouble finding the right application, as now there may be only one application to choose from. Thus, the systems and methods herein may make it possible for vendors, such as Security $1^{st}$, to easily provide a single product that can be tailored to fit any environment, such as the Security $1^{st}$ Mobile Security application depicted in FIG. 4B.

Figure 5B:
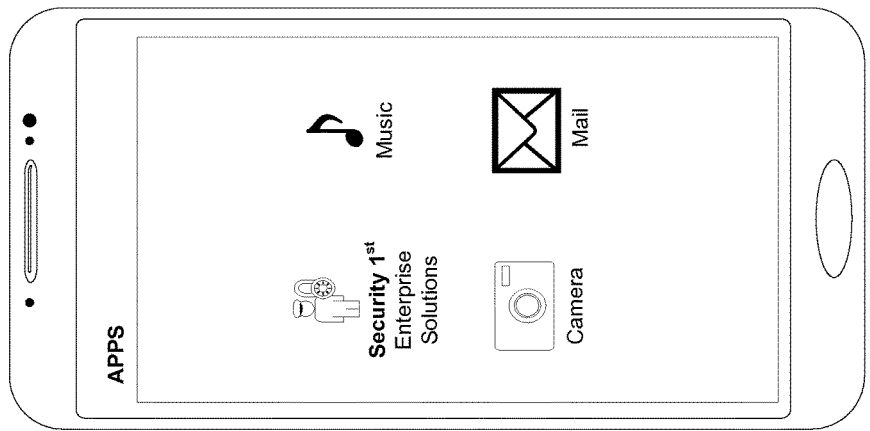
FIG. 5B is an illustration of an exemplary graphical user interface on a mobile computing device.
Figure 5A:
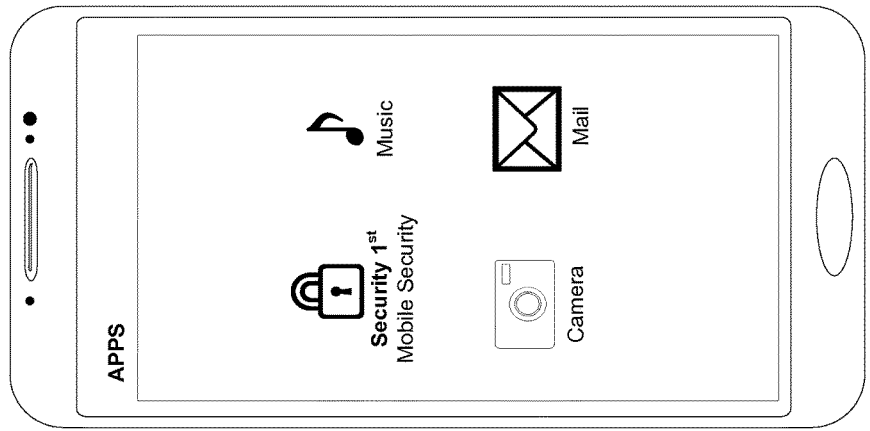
FIG. 5A is an illustration of an exemplary graphical user interface on a mobile computing device.

FIGS. 5A-5B illustrate how Security $1^{st}$ may, by implementing the systems and methods described herein, tailor an application to fit the mobile device environment within which it is being used. As will be described in greater detail below, the mobile computing device shown in FIG. 5A is the same mobile computing device shown in FIG. 5B and may represent any suitable mobile computing device. FIGS. 5A-5B also show an application launcher interface that may be used to start applications. The application launcher interface shows various launch icons that may, when tapped by a user of the device, execute launch activities that are associated with the launch icons. In the following description, the Security 1$^{st}$ application has been programmed with all of modules 102.

FIG. 5A shows that the Security 1$^{st}$ Mobile Security application has been downloaded from the mobile application store (depicted in FIG. 4B) and installed onto the mobile computing device. In this illustration, the Security 1$^{st}$ application may maintain three launcher activities within the Mobile Security application manifest—a default launcher activity, an enterprise launcher activity, and a consumer launcher activity. Each of these launcher activities may be associated with a different launch icon. These launch icons may include a graphical image and character string that, when enabled, are displayed in the application launcher interface. When the Security 1$^{st}$ application is installed, it may enable display of the default launch icon (shown in FIG. 5A). After installation, the Security 1$^{st}$ application may detect that an enterprise license was used to activate the application, and, based on this detection, select and enable display of the enterprise launch icon while disabling display of the default icon. FIG. 5B shows the result of this change, as the mobile computing device depicted in FIG. B now displays the enterprise launch icon. The Security 1$^{st}$ application shown in FIG. 5B also includes a different name (Security 1$^{st}$ Enterprise Solutions) than that shown in FIG. 5A (Security 1$^{st}$ Mobile Security). In some examples, when the Security 1$^{st}$ Enterprise Solutions launch icon is enabled, a notification may be displayed to a user of the mobile device notifying them that the application name and icon have been changed.

As described above, the systems and methods herein may enable an application name and icon to dynamically adapt to various mobile device environments without the need to recompile and reinstall the application. Users searching for a mobile product in an application store may be confronted with a confusing array of product versions. One product version may be intended for consumer environments while another may be intended for enterprise environments, but this may not always be clear to the user, and as such, the user may find the experience frustrating. Managing multiple versions of a product may be frustrating for developers and vendors as well, as developers may spend unnecessary time and resources maintaining several versions of the same product.

As discussed in detail above, the systems and methods described herein may overcome the aforementioned issues and/or other problems by designating multiple activities as launcher activities within the manifest of an APK. Each launcher activity may be configured to point to a different name and icon. When an environment for the application is discovered (e.g., when a license is used to activate the application), the systems and methods presented herein may enable the launcher activity that is associated with the environment and thus enable the system to display the name and icon associated with the launcher activity. The application may be configured in such a way that any launcher activity and its associated name and icon may be dynamically enabled and/or disabled, thereby allowing a single application to adapt to the environment within which it is being used. This in turn may provide vendors with better branding solutions, streamline the development process, and avoid user frustration.

Figure 6:
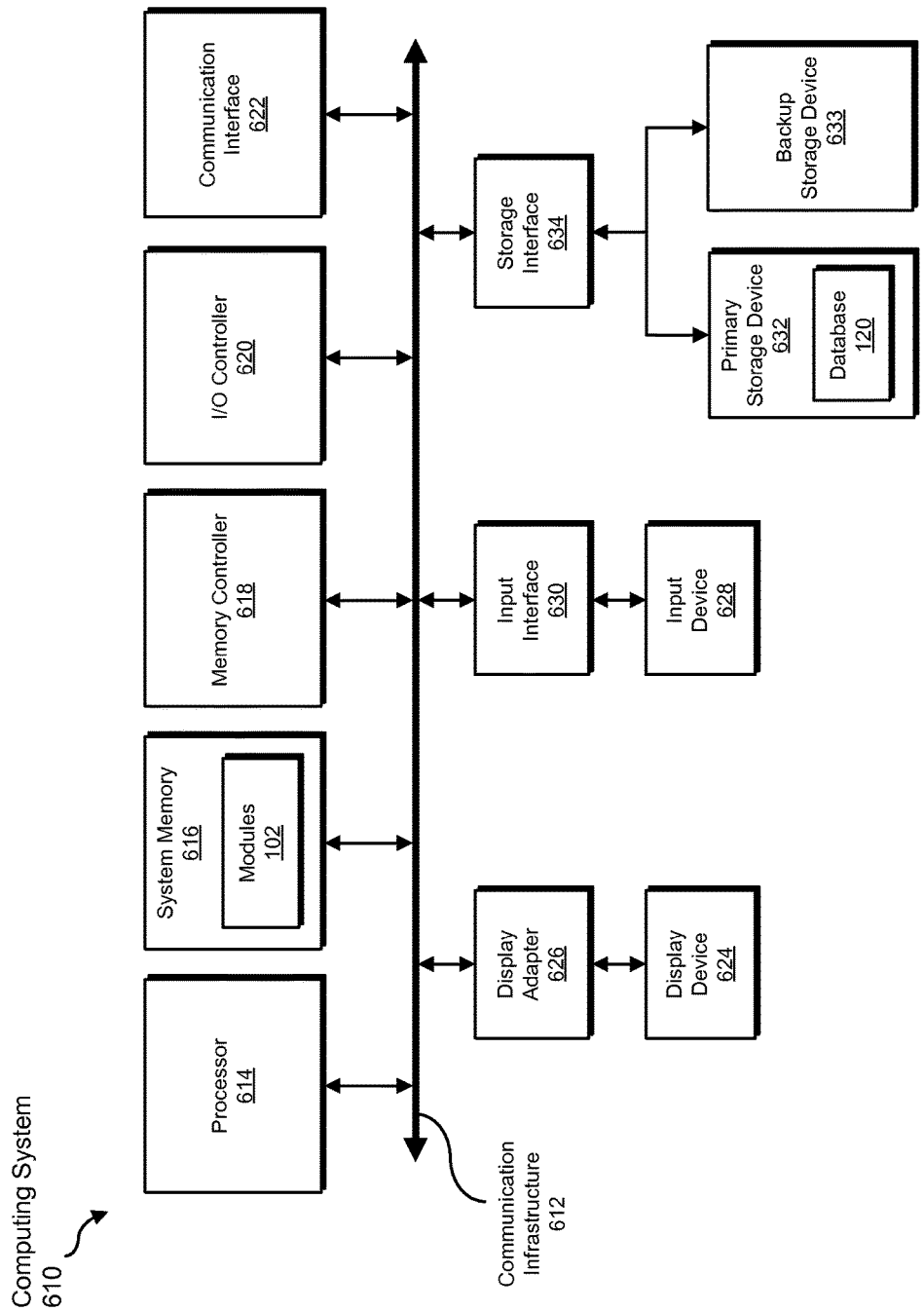
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
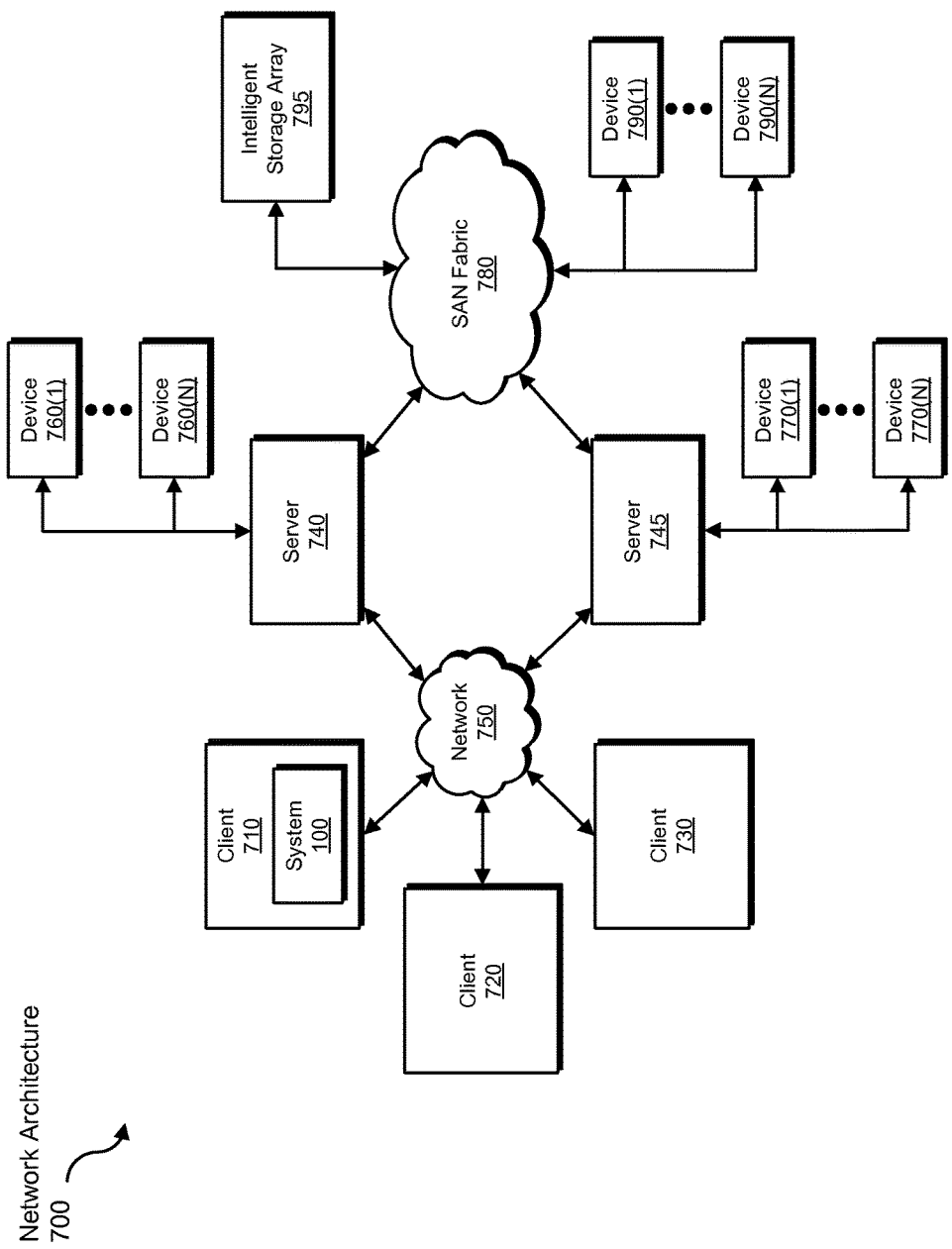
FIG. 7 is a block diagram of an exemplary network architecture capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture

700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of exemplary system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that storage devices 790(1)-(N) and intelligent storage array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing launch activities on a mobile device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a launch icon by identifying and transforming launch activity data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing launch activities on a mobile device, the method being performed by a mobile computing device comprising at least one processor, the method comprising:
    maintaining a plurality of launch activities associated with a single application, each launch activity in the plurality of launch activities being associated with a different launch icon for launching the single application;
    identifying a mobile device environment within which the single application is being used after installation;
    selecting, from the plurality of launch activities, a launch activity that corresponds to the mobile device environment; and
    enabling the launch activity that corresponds to the mobile device environment, wherein enabling the launch activity comprises enabling display of a launch icon associated with the launch activity.

2. The computer-implemented method of claim 1, wherein identifying the mobile device environment comprises identifying a license that was used to activate the single application.

3. The computer-implemented method of claim 1, wherein identifying the mobile device environment comprises identifying at least one of:
- a carrier of the mobile device;
- a manufacturer of the mobile device;
- a device type of the mobile device.

4. The computer-implemented method of claim 1, wherein the launch icon comprises a graphical image and an application name configured to be displayed within a root application launcher interface.

5. The computer-implemented method of claim 1, further comprising, after enabling display of the launch icon, displaying a notification within a graphical user interface on the mobile computing device that indicates to a user of the mobile computing device that display of the launch icon has been enabled.

6. The computer-implemented method of claim 1, wherein the mobile device environment displays, for launching the single application, a launch icon corresponding to the launch activity in response to identifying a list of the plurality of launch activities and determining that the launch activity is enabled.

7. The computer-implemented method of claim 6, wherein the mobile device environment does not display, for launching the single application, a different launch icon corresponding to a different launch activity in response to identifying the list of the plurality of launch activities and determining that the launch activity is disabled.

8. The computer-implemented method of claim 1, wherein maintaining the plurality of launch activities comprises maintaining, within the mobile computing environment and in association with an installed instance of the single application within the mobile computing environment, a list comprising the plurality of launch activities, wherein the list indicates whether each launch activity within the plurality of launch activities is currently enabled or disabled.

9. The computer-implemented method of claim 1, wherein the mobile computing environment supports altering a configuration of launch activities for the single application after the single application is installed within the mobile computing environment to specify which launch activities within the plurality of launch activities are currently enabled and therefore are represented with a launch icon within the mobile computing environment and which launch activities within the plurality of launch activities are currently disabled and therefore are not represented with a launch icon within the mobile computing environment.

10. The computer-implemented method of claim 1, further comprising, after identifying the mobile device environment within which the single application is being used, disabling at least one launch activity within the plurality of launch activities that does not correspond to the mobile device environment.

11. A system for managing launch activities on a mobile device, the system comprising:
- a maintenance module, stored in memory, that maintains a plurality of launch activities associated with a single application, each launch activity in the plurality of launch activities being associated with a different launch icon for launching the single application;
- an identification module, stored in memory, that identifies a mobile device environment within which the single application is being used after installation;
- a selection module, stored in memory, that selects, from the plurality of launch activities, a launch activity that corresponds to the mobile device environment;
- a launch configuration module, stored in memory, that enables the launch activity that corresponds to the mobile device environment, wherein the launch configuration module enables the launch activity by enabling display of a launch icon associated with the launch activity;
- at least one processor configured to execute the maintenance module, the identification module, the selection module, and the launch configuration module.

12. The system of claim 11, wherein the identification module identifies the mobile device environment by identifying a license that was used to activate the single application.

13. The system of claim 11, wherein the identification module identifies the mobile device environment by identifying at least one of:
- a carrier of the mobile device;
- a manufacturer of the mobile device;
- a device type of the mobile device.

14. The system of claim 11, wherein the launch icon comprises a graphical image and an application name configured to be displayed within a root application launcher interface.

15. The system of claim 11, further comprising a notification module, stored in memory, that displays a notification within a graphical user interface on the mobile device that indicates to a user of the mobile computing device that the display of the launch icon has been enabled.

16. The system of claim 11, wherein the launch configuration module disables at least one launch activity within the plurality of launch activities that does not correspond to the mobile device environment.

17. A non-transitory computer-readable-storage medium comprising one or more computer-executable instructions that, when executed by at least one processor of a mobile device, cause the mobile device to:
- maintain a plurality of launch activities associated with a single application, each launch activity in the plurality of launch activities being associated with a different launch icon for launching the single application;
- identify a mobile device environment within which the single application is being used after installation;
- select, from the plurality of launch activities, a launch activity that corresponds to the mobile device environment; and
- enable the launch activity that corresponds to the mobile device environment, wherein enabling the launch activity comprises enabling display of a launch icon associated with the launch activity.

18. The non-transitory computer-readable-storage medium of claim 17, wherein the one or more computer-executable instructions further cause the mobile device to identify the mobile device environment by identifying a license that was used to activate the single application.

* * * * *